United States Patent [19]

Böttger et al.

[11] Patent Number: 5,166,480
[45] Date of Patent: Nov. 24, 1992

[54] KNITTED FABRIC PANEL STRUCTURE AND PROCESS OF MANUFACTURE

[75] Inventors: Wolfgang Böttger, Ködnitz; Alfred Neupert, Stadtsteinach, both of Fed. Rep. of Germany

[73] Assignee: Vorwerk & Co. Interholding GmbH, Wuppertal, Fed. Rep. of Germany

[21] Appl. No.: 341,855

[22] Filed: Apr. 24, 1989

[30] Foreign Application Priority Data

Apr. 23, 1988 [DE] Fed. Rep. of Germany ....... 3813741

[51] Int. Cl.⁵ .................................................. E04B 1/82
[52] U.S. Cl. ..................... 181/292; 181/288; 181/294
[58] Field of Search .................. 181/286, 288, 290–294

[56] References Cited

U.S. PATENT DOCUMENTS

| | | | |
|---|---|---|---|
| 3,481,427 | 12/1969 | Dobbs | 181/292 |
| 3,700,067 | 10/1972 | Dobbs et al. | 181/292 |
| 3,756,346 | 9/1973 | Parker | 181/292 |
| 3,819,461 | 6/1974 | Saffadi | 428/102 |
| 3,960,236 | 6/1976 | Holmes | 181/292 X |
| 4,518,640 | 5/1985 | Wilkens | 428/102 |

*Primary Examiner*—Benjamin R. Fuller
*Assistant Examiner*—David Yockey
*Attorney, Agent, or Firm*—Watson, Cole, Grindle & Watson

[57] ABSTRACT

A knitted fabric panel structure has first and second spaced apart knitted layers and an intermediate spacing knit of ribs interconnecting the layers, the ribs of the spacing unit being of an industrial yarn of aramide fiber, carbon fiber, ceramic fiber, fiberglass, or blends of such fibers. The spacing knit is impregnated with a hardened resin such that the intermediate ribs form rigid spacing elements of the first and second layers.

2 Claims, 3 Drawing Sheets

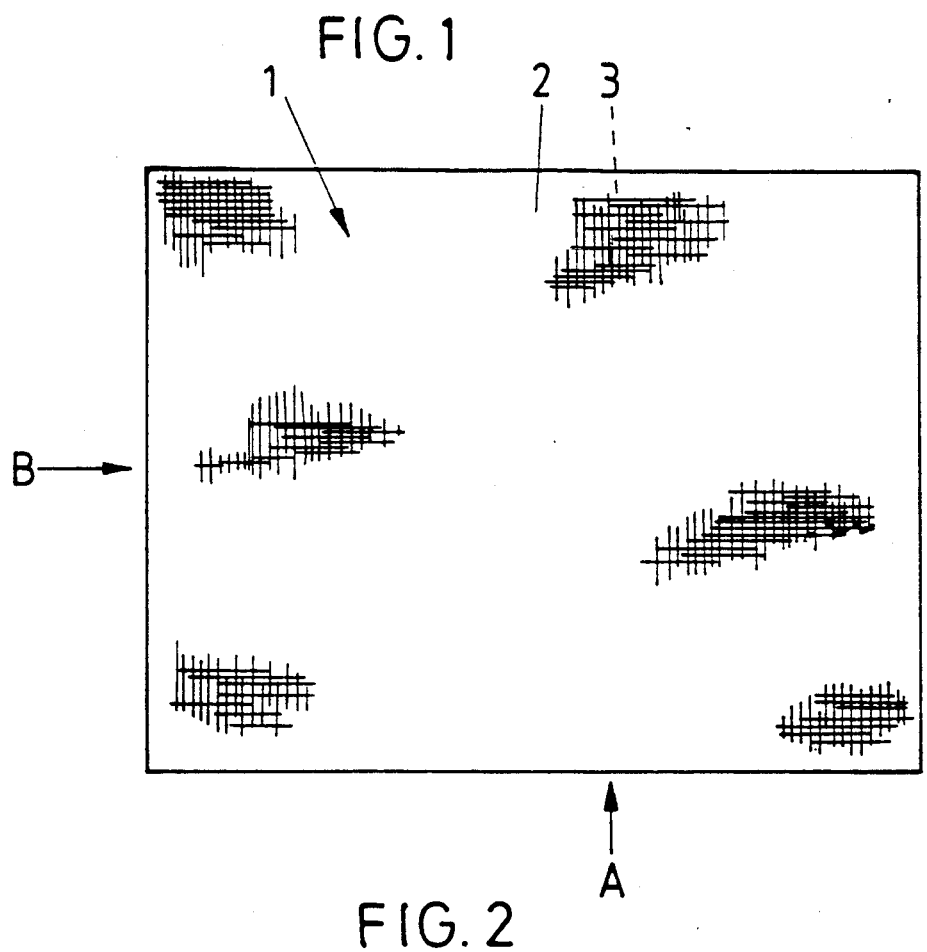
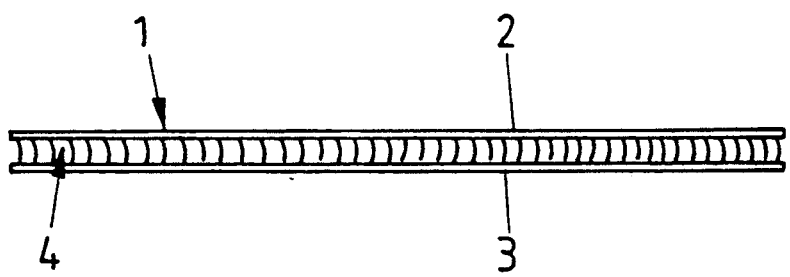
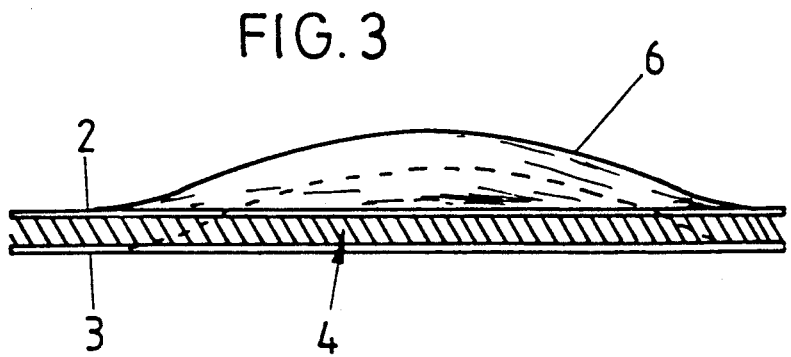

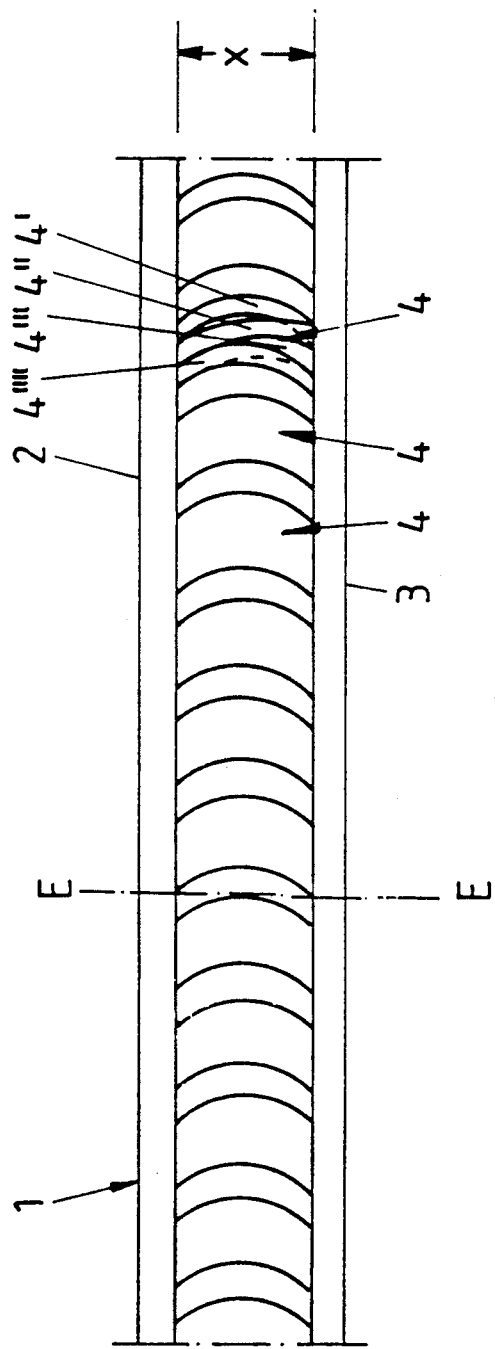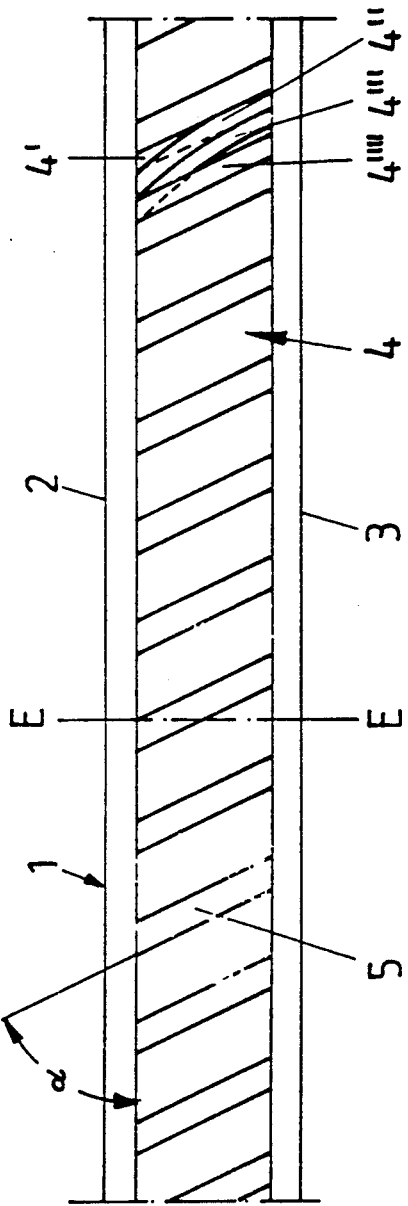

KNITTED FABRIC PANEL STRUCTURE AND PROCESS OF MANUFACTURE

BACKGROUND OF THE INVENTION

This invention relates to a knitted fabric panel structure and to a process of manufacture of the structure.

U.S. Pat. No. 3,481,427 discloses a three-dimensional woven fiberglass fabric impregnated with resin to create a rigid structural panel having intermediate spaced apart walls of ribbed cores forming dead air cavities. Because the woven structure tends to readily sag after resin hardening backup structure must be inserted in the cavities. This, however, results in a quite expensive production.

Resin-hardened fiber compounds have gained widespread use as structural panels or as sound absorbing elements. Such panels are used in aircraft structure because of their light weight, maximum rigidity and resistance to compression characteristics.

Weaves such as weft velvet and warp velvet may be used in weaving the three-dimensional panel. For economical production a double layer panel is made in the form of a so-called double velvet in which the pile threads used as connecting ribs between the layer-forming velour threads form a double layer. The length of the floating threads is adjustable so that various rib lengths can be effected. The pile threads are then cut between their ends on a cutting bench.

SUMMARY OF THE INVENTION

It is therefore an object of the present invention to provide a light weight, multi-layered panel structure of simple and economical construction yet highly effective and capable of being manufactured using available techniques and equipment and which has a high internal restoring force and following hardening has high internal stability yet requires relatively little resin.

Specifically, the knitted fabric panel structure according to the invention has first and second spaced apart knitted layers and an intermediate spacing knit of ribs interconnecting the layers. The ribs of the spacing knit are of an industrial yarn such as aramide fiber, carbon fiber, ceramic fiber, fiber glass or combinations of such fibers. The panel is impregnated with a hardened resin such that the intermediate ribs form rigid spacing elements of the first and second layers.

The intermediate ribs have a mean length greater than the spacing between the layers, are angularly disposed relative to the first and second layers, and are curved between opposite ends thereof. The ribs may be curved continuously in the same direction, and the ribs are mutually spaced apart and may comprise twisted individual strands.

The knitted fabric panel structure of the invention has high rigidity and resistance to compression while being of light weight. The distance between the layers is not bridged by woven wall sections but rather by free floating thread bridges which serve to brace the layers. Due to the combination of a knitted structure and the property of the ribs of the spacing unit, the rib-forming supports have a restoring force which is released tending to straighten out the ribs. The ribs brace the two layers apart at a short spacing. The structure, which is knitted using known techniques, can tolerate use without any reorientation in the interlacing areas with the layers. The abundance of loops of corresponding knitted fabrics offers a high flexible region of transition between the knitted layers and the intermediate ribs.

The knitted fabric panel structure of the invention is also capable of being formed into a curved or spherical structure without developing radial folds which are otherwise present in structures with flat surfaces. Because of the amount of thread used during the knitting process the distribution is almost distortion-free. The restoring force or stored energy of the intermediate ribs eliminates the need for any external backup structure.

When hardened with resin knitted fabric creates out of the many unevenly distributed, individual, freestanding intermediate ribs, such stable spacing elements that even the maximum loads during use of the panel structure can be absorbed without damage. In addition, a high degree of sound proofing or sound absorption is effected from the high number of cavities formed in the present structure.

Another commercially advantageous feature of the present structure is that the mean length of the intermediate ribs are greater than the distance between the layers. Thus, the intermediate ribs have at least partially a rather steep angular disposition such that the load applied along the entirety of the panel effects an equidirectional component of layer displacement. This is primarily beneficial for partial peak loads since then the entire structure acts as a unit to resist deformation.

The unidirectional attitude of the ribs facilitates determining the deflection of the ribs. And, the panel having angled intermediate ribs can be formed with a slight curvature. Stress along the axis of the intermediate ribs effects deflection avoiding mutual friction between the ribs.

The intermediate ribs are continuously curved in the same direction. The unidirectional curving provides equal zones of elasticity over the entire length of the intermediate rib. The orientation of the ribs is such that they have a vertical, column-like transitional region. The slight tilt attitude of the ribs in addition to their continuous unidirectional curvature effects the desired high restoring force of the panel structure. To avoid bulging when the ribs are subjected to compressive stresses, the ribs may be formed of slightly twisted individual ribs. Such an array of ribs provides a large number of multiple, local spring loadings. And, even greater distances between the first and second spaced layers of the panel structure can be bridged without compromising the stability. The slight twisting of the ribs spaces the individual ribs apart.

In accordance with the present process the first and second layers are knitted and spaced a predetermined distance apart by extending an intermediate spacing unit of ribs therebetween for interconnecting the layers during the knitting. The ribs of the spacing unit are of an industrial yarn having a restoring force such as aramide fiber, carbon fiber, ceramic fiber, fiberglass, or a blend of such fibers. The ribs of the spacing unit are impregnated with a resin, and a squeezing or compression force is applied to the layers for removing excess resin from the spacing knit, the ribs being distorted during this force applying step. The squeezing or compression force is removed for releasing the restoring force of the ribs, and the spacing unit is allowed to harden for forming the ribs as a rigid spacing element between the layers.

BRIEF DESCRIPTION OF THE DRAWINGS

FIG. 1 is a top plan view of the knitted fabric panel structure according to the invention;

FIG. 2 is a front side elevational view of the panel structure viewed in the direction of arrow A in FIG. 1;

FIG. 3 is an end elevational view of a panel structure similar to that of FIG. 1 but having a curved central section, and viewed in a direction of arrow B of FIG. 1;

FIG. 4 is an enlarged schematic view of FIG. 2;

FIG. 5 is an enlarged schematic view of FIG. 3 but without the curved central portion.

DETAILED DESCRIPTION OF THE INVENTION

Figure 6:
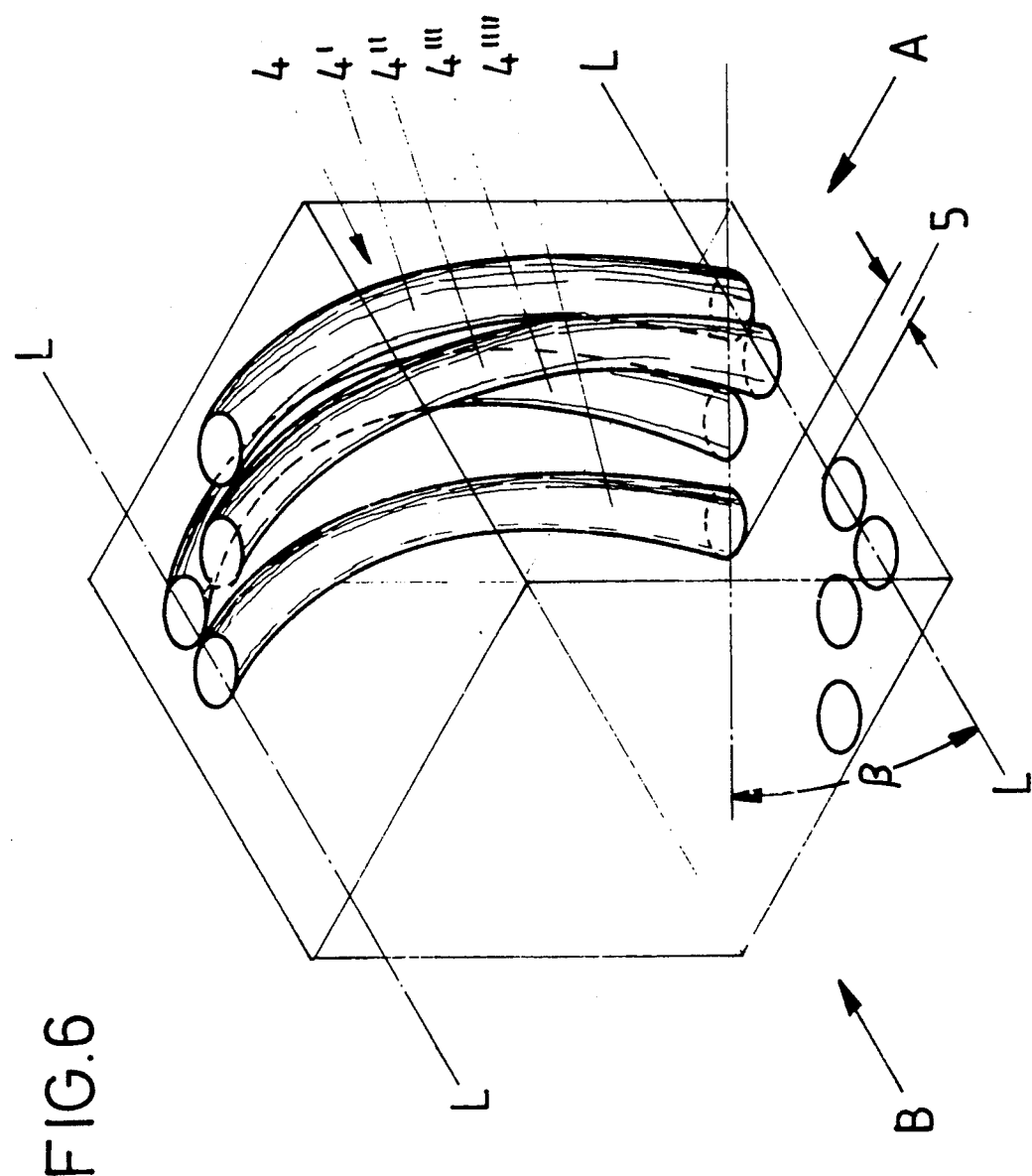
FIG. 6 is a perspective view illustrating in cube outline a representative arrangement of the individual, twisted ribs of the intermediate spacing knit between the outer layers of the structure of FIGS. 1-4.

Referring to FIGS. 1-3, a panel structure 1 of the invention is formed on a knitting machine as a multi-layered structure having a first, upper knitted layer 2 and a second, bottom knitted layer 3. The panel structure is formed using conventional knitting technology such as that used to manufacture velour.

An intermediate spacing knit of ribs 4 is formed during the knitting operation as having thread sections uniformly distributed throughout the panel. Intermediate ribs 4 interconnect the layers in spaced apart relationship. Panel structure 1 comprises a knitted fabric in which the upper and lower layers and the intermediate ribs are integrally joined forming a double velvet enmeshed structure.

The number of supporting threads or ribs 4 is a function of the knit density, such that by changing the number of thread ribs a greater or fewer number of intermediate ribs 4 can be generated continuously compared to that illustrated in the drawings.

Intermediate ribs 4 of the knitted structure are oriented substantially perpendicularly to parallel layers 2 and 3 so as to effect a highly elastic, relatively movable enmeshed fabric bed. Thus, if a portion of the knitted fabric which is not yet impregnated with resin is deformed, the rib sections can take over the compensating rib lengths from the highly looped enmeshed structure, or may be inserted into the knitted structure. Of course, this compensation relates to a portion of the rib length so that in the basic fabric the desired parallel relationship of the layers 2 and 3 is retained even when imposing a curved or spherical deformation to the basic fabric. The knitted fabric contracts more at the concave inner surface of the curvature such that the external convex surface of the curved layers is taken up from a given loop supply.

The ribs of the invention is made of industrial yarn such as aramide fiber, carbon fiber, ceramic fiber, glass fiber or various blends of these fibers.

Such fibers have an inherent restoring force after being subjected to compressive forces applied to layers 2 and 3. As a result of this restoring force inherent in such high performance fibers and also due to the connecting structure, the supporting threads forming intermediate ribs 4 have a tendency to restore themselves to an unstressed condition upon the removal of such compressive forces. This results in a parallel spacing of layers 2 and 3 illustrated by the spacing x between the layers in FIG. 4 which corresponds to several layers of thickness.

The intermediate spacing knit of ribs 4 as well as the remainder of the knitted structure is stiffened by impregnating the fibers with hardened resin so that intermediate ribs 4 between the first and second layers 2 and 3 form rigid spacing elements. After the fibers are resin impregnated the excess resin is squeezed out by applying a compressive force to the layers. The spontaneous repositioning or restoring of the intermediate ribs to their positions shown in FIGS. 4 and 5 occurs even after the panel structure has been completely compressed. Correspondingly, during knitting no damage is incurred as a consequence of the requisite redirecting and looping.

As illustrated in FIGS. 4, 5 and 6, the "mean length" of each of intermediate ribs 4 is greater than spacing x between layers 2 and 3. The free supporting thread sections forming ribs 4 do not change on the shortest path between the two adjacent parallel layers 2 and 3. Rather, as shown in the drawings, the ribs have a slight tilt as seen in FIG. 5. All the intermediate ribs have a unidirectional tilt forming a tilt angle of approximately 60° to the plane of the panel. The intermediate ribs extend in rows and in succession so that the ribs are mutually spaced apart as shown at 5 in FIGS. 5 and 6.

The knit profile of the panel can be seen when viewed in the direction of arrow A (FIG. 4) such that intermediate ribs 4 are each in the form of a continuous unidirectional curve. Thus, the true or mean length of each rib is greater than spacing x.

The term "mean length" is selected because each of the intermediate ribs 4 comprise a family of curved, tilted individual ribs 4', 4", 4''', 4'''' which are illustrated for only one of the ribs 4 in FIGS. 4 and 5 for the sake of clarity. The tilt and curvature of the ribs are unidirectional. In an imaginary extension of the ribs, the curvature and the tilt thereof result in a nearly spiral-shape of the individual ribs 4', 4", 4''', 4'''' of the intermediate ribs 4. The individual ribs traverse the spacing between layers 2 and 3 without making substantial contact with one another. Correspondingly the individual ribs serve as individually standing spring elements. To avoid bulges, the yarns comprising filaments are slightly twisted to form the individual ribs.

The individual ribs are together oriented at their ends terminating in layers 2 and 3 to form an angle of approximately 45° relative to a line of orientation L—L shown in FIG. 6. The spacial distribution of the terminal regions from top to bottom can be readily seen as provided in FIG. 6 by the orientation aid in the form of a cube. Accordingly, at the bottom, on the right, the individual ribs 4' and 4" lie substantially along line L—L, and the individual rib 4''' lies somewhat at right angles in the lateral vicinity of individual rib 4". Otherwise, individual rib 4'''', lying at a greater distance from ribs 4' to 4''' is arranged at the intersection of the diametrals of the bottom face of the cube. Tilted at an angle the upper ends of the individual ribs terminate in the upper face of the cube, although in the other half of the cube. At the upper face of the cube individual ribs 4''' and 4'''' lie along line L—L, and individual rib 4" is located at its upper root end adjacent individual rib 4''' inwardly of the cube such that individual rib 4' is located centrally between opposite sides of the cube at the upper face.

The region of the cube of the adjacent intermediate rib 4 toward the sight line B is merely indicated by circles at the bottom face of the cube, in the interest of clarity. Both lines L—L at the top and bottom faces of the cube lie parallel to the sight line B.

The column-like transitional regions of intermediate rib 4 are located relative to a vertical plane of a reference line E—E in such a manner that adjacent upper ends of the ribs slightly overlap one another as seen in FIG. 5. In FIG. 4, a plane E—E plotted in a corresponding direction, illustrates that adjacent ribs do not overlap in this direction. Rather, the ribs tapering into the upper and lower layers 2 and 3 lie in common plane E—E, and the middle section of an adjacent arched rib lying to the left of plane E—E is tangent to this plane.

The ends of the individual ribs 4' to 4'''' at layers 2 and 3 can have column-like material accumulations of synthetic resin forming stumps (not shown) which are somewhat comparable to the underground roots of trees. The result is an almost truncaded conical transition between the interior of layers 2 and 3 and the spacing elements. The truncaded conical base corresponds to the multiple of the cross-section of an individual rib 4' or 4'' or 4''' or 4''''. Despite the clearances 5 between intermediate ribs 4 and the clearances among the individual ribs in each of the clusters of ribs 4 the result is always a highly rigid, column-like spacing body that nevertheless exhibits some flexibility even in the stretch direction of the individual ribs.

Partial loads applied to panel 1 also brings the intermediate ribs lying in the outer areas of the panel into play, since as a consequence of the slight and unidirectional tilt, layers 2 and 3 shift in opposite directions upon the application of compressive forces against the layers. This provides good load distribution, and the aforedescribed orientations and shapes of intermediate ribs 4 also serve to dissipate forces.

The aforedescribed knitted panel structure is impregnated with commercially available resin plus a hardener. Excess resin is squeezed or rolled out so that the internal structure is resin-free except for the wetted, rib forming supporting threads and the two impregnated layers of fabric. The corresponding evacuation of resin to form a large percentage of cavities occurs to an extent that the restoring force of intermediate ribs 4 is released after the removal of the compressive squeeze forces until the ribs resume their initial relaxed positions. Alternatively, vacuum pressure can be applied for removing the excess resin until the resin-hardener reaction and does not remove until just before the final hardening. The structure that had been compressed up to that interval then rights itself up again. With, for example two layers and correspondingly precise and uniform application of the resin, it is not necessary to remove the excess resin content by squeezing or rolling. Following the drawing process, the hardened components are rigid and resistant to compression. The deformability can be controlled by corresponding layering such as fringe fabric, knitted fabric, satin or cloth, or by means or deep drawing. Thus, the corresponding improved formability of the spacing knit facilitates to a significant degree the manufacture of spherical or curved panels. Such a spherical shape is illustrated in FIG. 3, by reference numeral 6 although other shapes not illustrated can also be formed.

The sandwich-like construction of the present knitted fabric panel counteracts any tendency to delaminate due to its single cohesive structure.

Obviously, many other modifications and variations of the present invention are made possible in the light of the above teachings. It is therefore to be understood that within the scope of the appended claims the invention may be practiced otherwise than as specifically described.

What is claimed is:

1. A knitted fabric panel structure, comprising first and second spaced apart knitted layers, and an intermediate spacing knit of ribs interconnecting said layers, the ribs of said spacing knit comprising an industrial yarn selected from the group consisting of aramide fiber, carbon fiber, ceramic fiber, and fiberglass, said spacing knit being impregnated with a hardened resin such that the intermediate ribs form rigid spacing elements of the first and second layers, wherein said intermediate ribs are curved in one direction between opposite ends thereof and are angularly disposed in another direction relative to said first and second layers.

2. The structure according to claim 1, wherein said ribs are curved continuously in a same direction.

* * * * *